April 10, 1951     W. H. RUPP     2,548,499
CARBON DIOXIDE PURIFICATION PROCESS
Filed Feb. 17, 1948
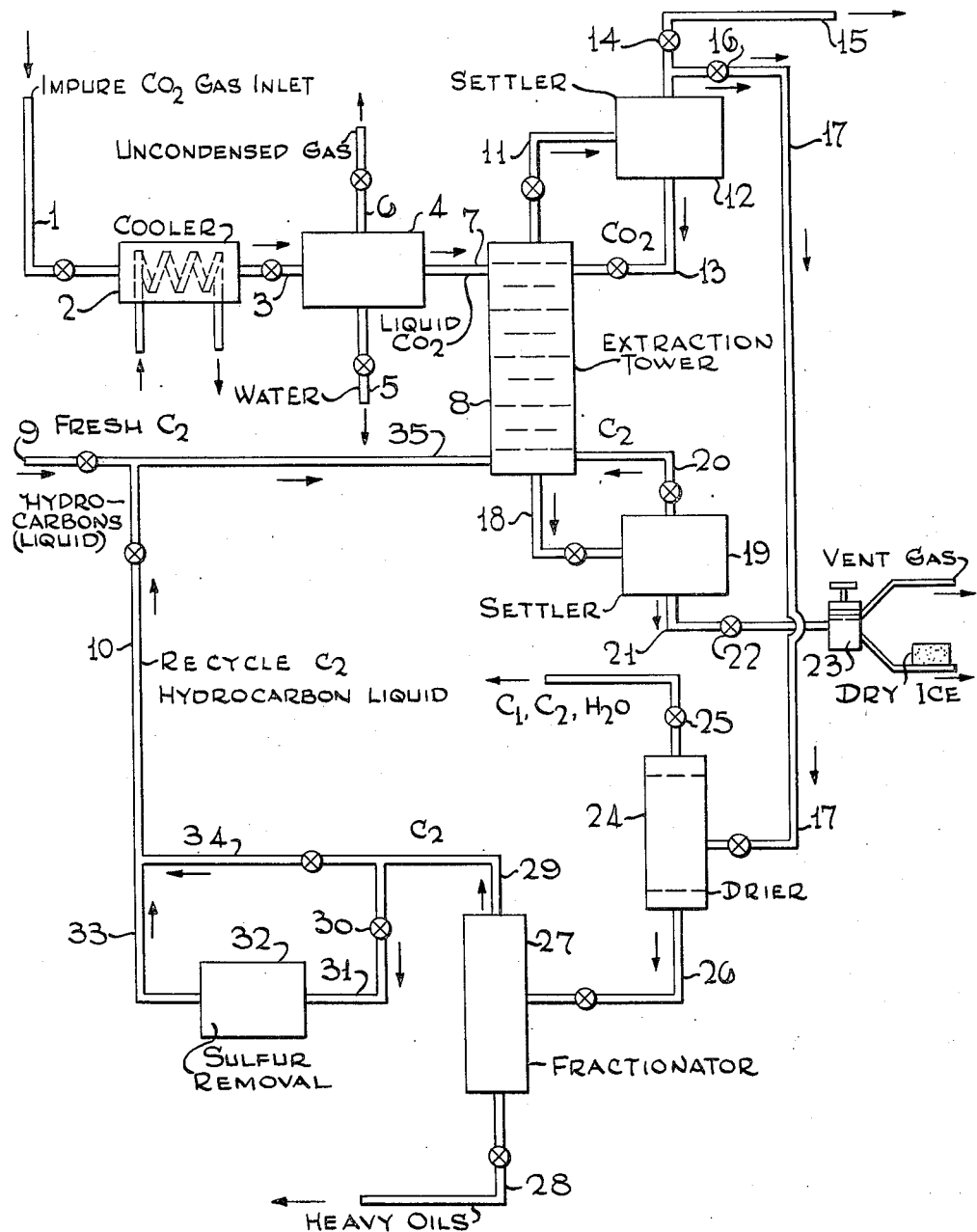
Walter H. Rupp, Inventor Patented Apr. 10, 1951

2,548,499

UNITED STATES PATENT OFFICE 2,548,499

CARBON DIOXIDE PURIFICATION PROCESS

Walter H. Rupp, Mountainside, N. J., assignor to Standard Oil Development Company, a corporation of Delaware Application February 17, 1948, Serial No. 8,844

8 Claims. (Cl. 23—150)

This invention relates to a purification process for carbon dioxide, and is particularly applicable to the purification of carbon dioxide to be used in the manufacture of Dry Ice. In particular, this invention concerns a liquid phase $CO_2$ purification process in which impure carbon dioxide is contacted with the $C_2$ hydrocarbons, ethane and ethylene, either separately or in admixture.

Carbon dioxide is obtainable from several sources. For example, it may be obtained from certain carbon dioxide rich natural gases, or as a by-product of a fermentation process, or by the combustion of various gases, cokes or oil fuels, or by the decomposition of limestone. The principal use of $CO_2$ is in the manufacture of the solid refrigerant known as "dry ice." For this use it is essential that the final product be of an extremely high purity for the reason that Dry Ice often comes in direct contact with foodstuffs. Consequently, it is generally essential to highly purify the carbon dioxide irrespective of the particular source of the $CO_2$.

At the present time a good many complicated methods of purification are used in the Dry Ice industry. All of these methods, however, are characterized by the fact that the purification of the $CO_2$ is carried out in gas phase. In general three steps are required to attain the necessary purification. The first step may comprise the removal of sulfur compounds generally present in the impure carbon dioxide obtained from the sources mentioned. The sulfur compounds may be removed by a variety of chemical reagents. For example, lead or zinc acetate solutions, sodium carbonate, sodium bicarbonate, caustic, diethanol amine, or other reagents may be employed. A second purification step is the removal of heavy oils and organic liquids and particularly of aromatic oils. Very small traces of heavy oils will impart unfavorable taste and odor to $CO_2$, or to the Dry Ice formed from $CO_2$. In order to effectively eliminate the heavy oils, therefore, gaseous $CO_2$ is conventionally contacted with charcoal, silica gel, etc. or alternatively the $CO_2$ is carefully fractionated from the heavy oil. The third treating step conventionally required is the removal of excess water. It should be noted that it is not desirable to remove all water, since a small proportion is desirable in order to impart good crystalline structure to the Dry Ice formed. However, excess water is objectionable in tending to freeze control valves, heat exchangers, etc. Generally solid drying agents are employed to remove undesired water from impure $CO_2$. Alumina, florite, sulfuric acid, silica gel, and other agents may be used.

It will be noted that in the conventional purification process outlined above, three purification steps are required. As stated each of the steps is carried out using gaseous carbon dioxide. It is a particular object of this invention to enable suitable purification to be made in a one step process and further to carry out the purification with the carbon dioxide in the liquid phase rather than the gaseous phase. The latter characteristic of this invention is desirable in permitting final Dry Ice production employing one compression step, thus eliminating any necessity for recompression during the process. Other objects and advantages of this invention will become apparent from the following detailed description in connection with the accompanying drawing in which is illustrated the flow plan of the purification process of this invention.

Referring to the drawing, $CO_2$ gas containing undesirable impurities as derived from any source such as the fermentation of sugar or combustion of coke is introduced through line 1, to a suitable cooler 2. This $CO_2$ gas must be under sufficient pressure to permit condensation at suitable temperatures. If the source of $CO_2$ does not provide the $CO_2$ gas at a sufficiently high pressure, a conventional type compressor, not shown in the drawing, may be employed. As illustrated the cooler 2 may comprise a simple heat exchanger employing cold water or an equivalent cooling medium to cool the $CO_2$-containing gas sufficiently to permit condensation under the pressure existing in the system. The cooler may, for example, be effective in dropping the temperature of the carbon dioxide to a range of 32 to 80° F. which will cause condensation at 500 to 1100 p. s. i. g. pressure respectively. If the water content of the carbon dioxide gas is substantially zero, the temperature can be lowered to 0° F. at 300 p. s. i. g. pressure to cause condensation. The cooled carbon dioxide is then conducted through line 3 to separator 4, wherein the carbon dioxide is collected as liquid $CO_2$. It may be noted that the presence of lower boiling gases than carbon dioxide tends to lower the condensation temperature required at a fixed pressure. During condensation, water or ice and some hydrocarbons tend to separate and may be withdrawn from the separator through line 5. Also fixed gases, or gases that are not condensed under the conditions of temperature and pressure employed may be withdrawn from the separator through line 6. The liquid carbon dioxide is then carried from separator 4 to an extraction tower 8 through line 7, being introduced at the top of the extraction tower. Pure $C_2$ hydrocarbons free of contaminants, are introduced to the bottom of the extraction tower 8, through lines 9, 10 and 35. The $C_2$ hydrocarbons should be substantially freed of all contaminants to be removed from the carbon dioxide. Either ethane or ethylene may be employed, or mixtures of ethane and ethylene. In either case the liquid carbon dioxide flows downwardly through the tower contacting upflowing $C_2$ hydrocarbons at temperatures ranging from 0 to 80° F. and pressures of 300–1100 p. s. i. g. A preferred range is 32 to 80° F. and 500 to 1100 p. s. i. g. The contactor or extraction tower may comprise a packed tower, or may consist of a perforated plate tower, or may comprise a high energy input mixing device such as a turbo mixer. The only requirement here is that tower 8, or its equivalent, be effective in securing intimate contact of the liquid $C_2$ hydrocarbons with the liquid $CO_2$. The liquid $C_2$ hydrocarbons are effective in extracting sulfur compounds, heavy oils, and water from impure $CO_2$. Thus the $C_2$ hydrocarbons removed from the top of tower 8 will comprise impure $C_2$ hydrocarbons contaminated with sulfur compounds, heavy oils and water initially present in the impure carbon dioxide. These materials withdrawn from line 11, are introduced to settler 12 wherein principally $CO_2$ is permitted to settle out and is returned to the extraction tower through line 13. The impure $C_2$ hydrocarbons are removed from the upper portion of the settler and may be withdrawn through valve 14 and line 15, and may be used as fuel gas, feed stock to another process etc. or may be withdrawn through valve 16 and line 17 for re-purification and recycling to the extraction tower. This re-purification of the $C_2$ hydrocarbons will be hereinafter described. Purified carbon dioxide, containing some $C_2$ hydrocarbons, is withdrawn from the bottom of the extraction tower 8 through line 18 and is introduced to settler 19. The upper phase separating in this settler comprises essentially $C_2$ hydrocarbons which may be withdrawn through line 20 and may be returned to the extraction tower. The lower phase in the settler is withdrawn through line 21 and is passed through a throttling valve 22 wherein the pressure of the liquid carbon dioxide stream is greatly reduced. Solidification of a portion of the carbon dioxide is accomplished by dropping the pressure of the liquid $CO_2$ in valve 22 to about 0 to 60 p. s. i. g. This operation is effective to cool the $CO_2$ sufficiently to sublime the $CO_2$ into solid "snow." The $CO_2$ snow is then introduced into a conventional Dry Ice press 23 wherein the snow may be compressed to solid carbon dioxide and shaped into blocks known to commerce as "dry ice."

As stated, the impure $C_2$ hydrocarbons removed from extraction tower 8, may be suitably purified so that the hydrocarbons may be recycled in the purification system if desired for economy reasons. For this purpose the impure $C_2$ hydrocarbons are conducted through line 17 to a drying tower 24. This tower can be a chamber containing alumina or some drying agent or alternatively can be a conventional fractionation tower employing conventional bottom reboiling and top refluxing. The tower should have about 20–40 plates and can operate from 300 to 600 p. s. i. g. pressure. In this case, fixed gases dissolved in the $C_2$ hydrocarbons such as methane together with carbon dioxide and water vapor will be substantially removed overhead through line 25 at a temperature of 0 to 70° F. while $C_2$ hydrocarbons and heavier hydrocarbons are removed from the bottom of tower 24 through line 26 at a temperature of 15 to 85° F. The bottoms of tower 24 are then conducted through line 26 to conventional fractionator 27, which is of similar construction to tower 24 and operates at 280–580 p. s. i. g., preferably 500–580 p. s. i. g. pressure. The fractionation carried out in tower 27 is effective to cause $C_3$ hydrocarbons and higher hydrocarbons together with at least a portion of the sulphur contaminants, shown on the drawing as heavy oils, to be produced as a bottoms product so as to be withdrawn through line 28 at a temperature of 100 to 200° F. The substantially pure $C_2$ hydrocarbons are then removed overhead through line 29 at 15 to 85° F. temperature. Depending upon the sulfur content of the original carbon dioxide purified it may be necessary to contact the $C_2$ hydrocarbons of line 29 with a suitable chemical reagent to insure low sulfur content hydrocarbons. As illustrated, if this is desirable, or necessary, the $C_2$ hydrocarbons of line 29 may be passed through valve 30 and line 31 to the sulfur removal tank 32 wherein the hydrocarbons are contacted with a suitable chemical reagent to extract the sulfur compounds. This agent may consist, for example, of caustic, sodium carbonate, or diethanol amine. The $C_2$ hydrocarbons purified as described are then removed from sulfur removal vessel 32 through line 33, or are caused to bypass vessel 32 through line 34 and are returned to the extraction tower 8, through lines 10 and 35.

In general about 10–200%, of liquid $C_2$ hydrocarbons, by volume based on liquid carbon dioxide, is necessary to suitably purify the carbon dioxide. The exact percentage required depends entirely upon the volume of contaminants present. For the purification of carbon dioxide which is obtained in relatively pure form, this process will be satisfactory for purifying the carbon dioxide in a once through ethane or ethylene treating process using only about 10–50% $C_2$ hydrocarbons by volume on liquid $CO_2$. This is particularly true of carbon dioxide derived from natural wells. In the United States and various parts of the world, there are a number of prolific wells producing natural gases containing up to 97% carbon dioxide. Typical compositions of such gases are indicated in Table I.

TABLE I

| | Mol percent |
|---|---|
| Methane | 1 – 5 |
| Ethane | 1 – 5 |
| Carbon dioxide | 97.7– 89.3 |
| Propane and heavier | 0.2– 0.5 |
| Sulfur compounds ($H_2S$, mercaptans) | 0.1– 0.2 |
| | 100.0 100.0 |

Such well gases, as stated, are particularly adapted to the formation of Dry Ice by the process of this invention. For example, if the natural well gas may be separated from the crude oil at a separator pressure maintained at about 1000 to 1100 lbs., p. s. i., liquefaction of the carbon dioxide may be obtained without compression by simple cooling to 70–80° F. In the case of wells generating carbon dioxide at lower pressures, refrigeration or greater compression may be used to liquefy the gas. For the composition of natural gases indicated, purification according to this invention may be readily carried out using a $C_2$ hydrocarbon treat of about 10-50%.

As described, this invention consists of a liquid carbon dioxide purification process wherein liquid carbon dioxide is contacted with liquid $C_2$ hydrocarbons. Intimate contact of these liquids is effective to substantially purify the carbon dioxide, eliminating sulfur compounds, excess water, and heavy oils. This purification process is applicable for the purification of carbon dioxide as obtained from any source, and for whatever purpose the carbon dioxide is to be used. As brought out, however, the purification process is particularly adapted for use in the manufacture of Dry Ice, and is furthermore, particularly effective in the purification of natural gases rich in carbon dioxide.

While the process has been described as being suitable for securing substantially pure carbon dioxide suitable for conversion to Dry Ice, it must be understood that the teachings of this invention may be broadly applied to purify carbon dioxide to a lesser extent. For example, the carbon dioxide may be purified with less than the preferred quantities of liquid $C_2$ hydrocarbons so as to facilitate throughput, and to secure a somewhat less purified carbon dioxide. Again, while it is preferred that liquid $C_2$ hydrocarbons be employed in the contacting step, it is within the teachings of this invention to employ $C_3$ and even $C_4$ hydrocarbons for this purpose. The limitation on employing $C_3$ and $C_4$ hydrocarbons lies in the difficulty of freeing these hydrocarbons from the liquid carbon dioxide after the contacting step. Consequently, when employing these hydrocarbons rather than $C_2$ hydrocarbons, the separation attained in the settler 19 will not be as great, and the separation obtained on flashing the carbon dioxide with residual traces of the hydrocarbons will likewise not be as great. However, it is intended that the process described may be employed with $C_3$ and $C_4$ hydrocarbons as well as with $C_2$ hydrocarbons. The carbon dioxide gas obtained in this case, however, would not be sufficiently pure to provide the best quality Dry Ice.

Having now fully described the invention, what is claimed is:

1. A process for the purification of carbon dioxide in which impure liquid carbon dioxide is intimately contacted with liquefied hydrocarbons having two carbon atoms, whereby the said impure carbon dioxide is substantially purified of sulfur compounds, water and heavy oils.

2. In the manufacture of Dry Ice wherein natural well gases, rich in carbon dioxide are employed, the improvement which comprises purifying said natural gases by liquefying said gases and thereafter contacting the said liquefied gases with liquefied hydrocarbons having two carbon atoms, 3. The process for purifying carbon dioxide which consists of the steps of contacting said carbon dioxide in liquid phase with liquefied hydrocarbons having two carbon atoms, withdrawing the said hydrocarbons employed in said contacting step and fractionating them whereby substantially pure hydrocarbons are obtained, and recycling said substantially pure hydrocarbons to the contacting step.

4. The process defined by claim 1 wherein about 10-200% of the said hydrocarbons are employed per volume of liquid $CO_2$.

5. The process defined by claim 1 wherein the said hydrocarbons consist principally of ethane.

6. The process for the purification of carbon dioxide contaminated with sulfur compounds, water, and heavy oils in which the said impure carbon dioxide is contacted in the liquid phase with liquefied hydrocarbons having two carbon atoms at a temperature of 0° to 80° F.

7. The process for the purification of carbon dioxide contaminated with sulfur compounds, water, and heavy oils in which the said impure carbon dioxide is contacted in the liquid phase with liquefied hydrocarbons having two carbon atoms at a pressure of 300 to 1100 p. s. i. g. and at a temperature of 0° to 80° F.

8. A process for the purification of carbon dioxide in which impure liquefied carbon dioxide is intimately contacted with liquefied hydrocarbons selected from the group consisting of hydrocarbons having 2 to 4 carbon atoms inclusive, whereby the said impure carbon dioxide is substantially purified of sulfur compounds, water and heavy oils.

WALTER H. RUPP.

REFERENCES CITED

The following references are of record in the file of this patent:

UNITED STATES PATENTS

| Number | Name | Date |
|---|---|---|
| 1,730,805 | Claude | Oct. 8, 1929 |
| 1,804,432 | Pollitzer | May 12, 1931 |
| 2,020,189 | Jones | Nov. 5, 1935 |
| 2,039,330 | McKee | May 5, 1936 |
| 2,088,497 | Tijmstra | July 27, 1937 |
| 2,327,134 | Schuftan | Aug. 17, 1943 |
| 2,378,762 | Frey | June 19, 1945 |

OTHER REFERENCES

"Faraday's Encyclopedia of Hydrocarbon Compounds $C_1$ to $C_5$," under $C_2H_6$, Sheet Number 02019.00.96.

"An Outline of Organic Chemistry," 1937 ed., pp. 28, 32, by Degering, Nelson and Harrod. Barnes & Noble, Inc., N. Y.